Patented Aug. 23, 1927.

1,639,658

UNITED STATES PATENT OFFICE.

CHARLES HENRI MARSCHALK, OF PARIS, FRANCE.

IMPROVED PROCESS FOR THE MANUFACTURE OF PERYLENE.

No Drawing. Application filed December 13, 1923, Serial No. 680,362, and in France December 21, 1922.

Perylene has been made by treating beta derivatives of naphthalene or alpha-dinaphthyl with a halogenating agent and then transforming the product so obtained into perylene by the employment of a neutral solvent or by a heat treatment with a reducing agent or by treating it with a ring forming agent.

It is very difficult, if not impossible, to carry out this process commercially.

This invention has for its object a process in which none of the difficulties encountered in the known process is met with, and in which large quantities can be operated to produce large yields, whereby the process is rendered really commercial.

According to this invention, a body such as phosphorus oxychloride and a metal such as zinc are caused to react upon a dihydroxylated compound of alpha-dinaphthyl (beta-dinaphthol for example) whereby an intermediate product is produced, which when distilled produces a considerable proportion of perylene, together with other products among which dinaphthylene oxide predominates.

The intermediate product may of course be made in the apparatus in which the subsequent distillation is effected or different apparatus may be employed for the two stages of the process.

This process differs from the known process in that:

1. In the old process dihalogenated derivatives of alpha-dinaphthyl are the starting products or are made in the first stage of the process while in the process in accordance with the invention, dichlorodinaphthyl cannot be isolated during or after the formation of the intermediate body (phosphorus oxychloride not being employed as a chlorinating agent).

2. In the old process a derivative of phosphorus such as phosphorus acid is used, together with a halogenating body. This has for result that in the later heat treatment, a violent reaction takes place with a considerable evolution of phosphine which, as it may spontaneously ignite, renders the process very difficult to carry out commercially. In distillation of the new process no evolution of phosphine can occur, and so large quantities of material may take part in the reaction.

3. In the old process in some cases an intermediate product is isolated which is afterwards treated with boiling sodium or potassium hydroxide. This treatment, however, completely decomposes and dissolves such intermediate product which indeed is produced in the present process.

The invention is illustrated in the accompanying example. The proportions of the reacting bodies and the temperatures employed may, however, be varied within fairly wide limits. The reaction may be carried out in vacuo or a current of inert gases may be employed. Quick lime may also be added for fixing a portion of the phosphorus formed in the reaction, but this is not necessary either for the formation of perylene or for the commercial application of the process.

*Example.*—One molecule of beta-dinaphthol is mixed with two molecules of phosphorus oxychloride and the mixture heated to about 100° C. Three atoms of zinc dust are then slowly added, whereupon the temperature is raised to 200° C. to complete the reaction and to eliminate the excess of phosphorus oxychloride. A dry and brittle mass is thereby obtained which is then heated in a retort to about 600° C. Orange vapours are evolved which rapidly form a brown crystalline mass. On crystallizing out of toluene, a first crop of crystals is obtained which comprises nearly the whole of the perylene; the crystals are of a bronze colour and melt at about 260° C.

What I claim is:

1. The manufacture of perylene by treating betadinaphthol with phosphorus oxychloride and zinc powder, and thereafter distilling the intermediate product thereby obtained.

2. In the process of claim 1, the step of adding quick-lime to the intermediate product before distillation to fix the phosphorus produced in the reaction.

3. The manufacture of perylene by treating betadinaphthol with phosphorus oxychloride, adding quick-lime to the intermediate product thereby obtained, and distilling the mixture.

4. The manufacture of perylene by heating betadinaphthol with phosphorus oxychloride at about 100 degrees C., adding zinc powder and heating the mixture at about 200 degress C., adding quick-lime, and finally distilling the mass at about 600 degrees C.

In testimony whereof I affix my signature.

CHARLES HENRI MARSCHALK.